(12) United States Patent
Stevenson (10) Patent No.: US 10,890,523 B2
(45) Date of Patent: Jan. 12, 2021

(54) MULTI-TEMPERATURE OPTICAL SPECTROMETER MODULES, SYSTEMS AND METHODS OF USING THE SAME

(71) Applicant: Agilent Technologies, Inc., Santa Clara, CA (US)

(72) Inventor: Hugh Charles Stevenson, Hughesdale (AU)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 16/479,154

(22) PCT Filed: Jan. 16, 2018

(86) PCT No.: PCT/IB2018/050244
§ 371 (c)(1),
(2) Date: Jul. 18, 2019

(87) PCT Pub. No.: WO2018/134722
PCT Pub. Date: Jul. 26, 2018

(65) Prior Publication Data
US 2020/0041405 A1    Feb. 6, 2020

(30) Foreign Application Priority Data

Jan. 19, 2017 (AU) ............................... 2017900158

(51) Int. Cl.
*G01N 21/31* (2006.01)
*G01N 21/03* (2006.01)
*G01N 21/25* (2006.01)

(52) U.S. Cl.
CPC ....... *G01N 21/0332* (2013.01); *G01N 21/255* (2013.01); *G01N 21/31* (2013.01); *G01N 2021/0367* (2013.01)

(58) Field of Classification Search
CPC ................ G01N 21/0332; G01N 21/31; B01L 2300/0829; B01L 2300/1827; B01L 2300/1844; B01L 7/52
See application file for complete search history.

(56) References Cited

U.S. PATENT DOCUMENTS 4,543,481 A    9/1985 Zwick
6,337,435 B1 * 1/2002 Chu .................. B01L 7/52
                                    136/203
(Continued)

OTHER PUBLICATIONS

International Search Report and Written opinion dated May 18, 2018, Application No. PCT/IB2018/050244, 12 pages.

*Primary Examiner* — Maurice C Smith (57) ABSTRACT

An optical spectrometer module for analysing samples. The optical spectrometer module comprises two or more sample holders. Each sample holder is adapted to receive and reproducibly position a sample in fixed locations within the optical spectrometer module. Each sample holder is also adapted to receive a light beam to thereby enable a sample contained in the sample holder to be exposed to the received light beam. Each sample holder is further adapted to enable light transmitted through the sample holder to exit the sample holder. The optical spectrometer module also comprises two or more electro-thermal components. Each electro-thermal component is thermally coupled to a respective sample holder to control the temperature of the sample holder.

14 Claims, 4 Drawing Sheets

(56) References Cited

U.S. PATENT DOCUMENTS

| | | | |
|---|---|---|---|
| 6,599,253 B1 | 7/2003 | Baum et al. | |
| 6,730,883 B2* | 5/2004 | Brown | B01L 3/50851 |
| | | | 219/385 |
| 6,825,927 B2* | 11/2004 | Goldman | G01N 21/64 |
| | | | 356/317 |
| 8,709,787 B2* | 4/2014 | Handique | B01L 3/502723 |
| | | | 435/283.1 |
| 9,446,410 B2* | 9/2016 | Evans | B01L 7/52 |
| 9,604,219 B2* | 3/2017 | Mortillaro | B01L 7/52 |
| 2010/0118315 A1* | 5/2010 | Pastel | B01L 3/5085 |
| | | | 356/614 |
| 2011/0042582 A1* | 2/2011 | Ingber | G01N 21/0332 |
| | | | 250/458.1 |
| 2011/0111968 A1* | 5/2011 | Okura | B01L 7/00 |
| | | | 506/7 |
| 2014/0255940 A1* | 9/2014 | Jenoski | B01L 3/5085 |
| | | | 435/6.12 |

* cited by examiner

MULTI-TEMPERATURE OPTICAL SPECTROMETER MODULES, SYSTEMS AND METHODS OF USING THE SAME

CROSS-REFERENCE TO RELATED APPLICATION

This application is a national stage entry pursuant to 35 U.S.C. §371 of International Application No. PCT/IB2018/050244, filed on Jan. 16, 2018, which claims priority to Australian Application No. 2017900158, filed on Jan. 19, 2017, the contents of all of which are fully incorporated herein by reference.

TECHNICAL FIELD

The present disclosure generally relates to optical spectroscopy equipment and systems and methods of optical spectroscopy. More specifically, the present disclosure relates to equipment, systems and methods for optical spectroscopy with controlled temperatures.

BRIEF DESCRIPTION OF DRAWINGS

Embodiments are described in further detail below, by way of example, with reference to the accompanying drawings briefly described below.

DETAILED DESCRIPTION

Spectrometers are instruments used for the analysis of samples to identify the presence of or determine the concentrations of materials or substances (e.g., molecules, elements, or compounds) of interest, i.e. the analyte. Optical spectrometers, also known as spectrophotometers, may utilise electromagnetic energy in the form of light in the ultraviolet (UV), visible or infrared (IR) range that is directed to interact with a sample. By analysing the amount of light absorbed or emitted by each sample, a determination can be made as to the sample constituents and amounts. For example, UV-visible spectroscopy may expose samples to light with a wavelength in the UV-visible range. Measuring the characteristics of the resultant light following interaction with the sample (for example the light intensity and/or wavelengths of light transmitted, absorbed, or emitted by a sample) the type of sample material or amount of substance of interest can be evaluated. For example, the amount of optical absorption associated with a sample can be related to various analyte concentration(s) by calibration of the spectrometer.

A reference measurement may also be conducted where no sample is present and light is transmitted through the spectrometer for detection. This can be used to establish the baseline light intensity for comparison with the transmitted light through a sample for calculation of the level of optical absorption by the sample. For example, to account for instabilities in the light used, spectrometers may use a configuration where some of the light is diverted into a separate reference beam which is measured as a reference to account for variations in the optics and source of the instrument. These are known as dual-beam or double-beam spectrophotometers.

The physical and spectral properties of a sample may be changed or be affected by temperature. In spectrophotometric analysis of a sample, thermal variations during data acquisition for a single sample or between samples can result in inaccuracies or difficulties in obtaining quality data. It may therefore be important to provide for fine temperature control and maintaining consistency of the sample temperature during measurement. The effect of temperature variations on the spectral properties of a sample can also impact measurements taken with respect to a reference and may impact the "baselining" of spectral properties of the sample holder (e.g. cuvette) or carrier medium as well.

Additionally, in some experiments or analytical protocols it may be desirable to acquire spectral measurements at different temperatures or temperature ranges. While existing spectrometers may use a single temperature controller to attempt to maintain a selected constant temperature for sample analysis these instruments are not able to provide concurrent flexible independent temperature control for the analysis of multiple samples or references. Such temperature control would allow for parallel measurements of samples to be taken at different temperatures rather than having to perform sequential or serial sample analysis where the temperature must be adjusted between data acquisitions. It will be appreciated that the instrument and methods described in connection with the present teachings may advantageously be adapted to extend the functionality of spectrometers enabling them to readily and easily conduct measurements on samples at different temperatures and provide higher quality data due in part to a finer level of control over sample temperature during analysis.

Samples for analysis with optical spectroscopy may possess fluidic or semi-fluidic properties or may be liquids, solids, gases or particulates suspended in a carrier medium such as a solvent or other medium that permits input light energy to interact with the sample and resultant-light properties to be evaluated. Liquid or fluid suspended samples to be analysed are typically contained in a sample container known as a cuvette. The cuvette (often made from quartz) and carrier medium may contribute to the optical interactions and it may be important to take the properties of these materials into consideration to accurately determine the presence and/or amount of analyte that may be present in the sample. Any contribution of the cuvette material and carrier medium to the resultant light detected from the cuvette can be taken into consideration by measurement of the light properties or transmission characteristics through a reference cuvette which only contains the carrier medium(if used).

Alternatively, calibration data for a particular analyte may have been obtained using a specific solvent or carrier medium. In this case, it is not necessary to conduct a reference measurement with a sample cell or carrier medium. Absorption by the cuvette and/or carrier liquid can also be accounted for numerically or computationally during data analysis.

Any discussion of documents, acts, materials, devices, articles or the like which has been included in the present specification is not to be taken as an admission that any or all of these matters: form part of the prior art base; were common general knowledge in the field relevant to the present disclosure as it existed before the priority date of each claim of this application; or could have been understood, regarded as relevant or reasonably expected to have been combined by a person skilled in the art.

Some embodiments of the present disclosure relate to an optical spectrometer module for analysing samples comprising:

two or more sample holders, each sample holder adapted to:
  receive and reproducibly position a sample in fixed locations within the optical spectrometer module;
  receive a light beam to thereby enable a sample contained in the sample holder to be exposed to the received light beam; and
  enable light transmitted through the sample holder to exit the sample holder; and
two or more electro-thermal components, each electro-thermal component thermally coupled to a respective sample holder to control the temperature of the sample holder.

In some embodiments, the two or more electro-thermal components each comprise a thermoelectric device. At least one of the sample holders may be used as a reference. The two or more sample holders are formed from a material with high thermal conductivity.

The optical spectrometer module may further comprise a heat exchange component adapted to assist in heat exchange between the two or more sample holders and surrounding air. In some embodiments, the heat exchange component comprises a plurality of vanes thermally coupled to the two or more sample holders and a blower arranged to blow air over the plurality of vanes. The heat exchange component may also comprise an internal channel to enable a liquid to flow through.

In some embodiments, the optical spectrometer module further comprises one or more temperature controllers coupled to the two or more electro-thermal components. The one or more temperature controllers may control each of the electro-thermal components individually.

The optical spectrometer module may also comprise a support attached to each sample holder. In some embodiments, the optical spectrometer module comprises two or more supports, each support attached to one or more sample holders.

In some embodiments, at least two of the sample holders are separated by a gap. The gap may comprise a material with low thermal conductivity. The two or more sample holders may be fixed in position.

The optical spectrometer module may further comprises two or more detectors, wherein each detector is located adjacent one receptacle to directly measure light transmitted through samples and enable concurrent measurements from the reference sample and the one or more samples to enable a level of optical absorption by the one or more samples to be determined.

Each receptacle may comprises at least one sidewall defining: an opening adapted to receive the one of the two or more light beams; an exit positioned opposite the opening to enable the light transmitted through samples to be measured by the two or more detectors.

The optical spectrometer module according to any one of the preceding claims, wherein each receptacle defines an opening at an upper end of the receptacle for receiving the sample cell.

Some embodiments of the present disclosure relate to a method of optical analysis comprising:
  receiving light at the optical spectrometer module according some embodiments;
  exposing test samples received in two or more sample holders to the received light; and
  controlling the temperature of at least two of the two or more sample holders to be at a predetermined temperature.

In some embodiments, controlling the temperature comprises controlling the temperature of each sample holder to be at a different predetermined temperature.

The method may also comprise measuring the intensity of light transmitted through a sample holder with a detector to obtain a reference signal.

In some embodiments, the method may further comprise measuring the intensity of light transmitted through one or more test samples to obtain a sample signal, wherein the intensity of light transmitted is measured with one detector.

The method may also comprise determining one or more levels of optical absorption by comparing the reference signal with the sample signals.

In some embodiments, controlling the temperature comprises exchanging heat between a heat exchange component and the sample holders with either an air blower or a flowing liquid.

Controlling the temperatures may further comprise controllably heating the sample holders with a thermoelectric device or resistive heater.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Figure 1:
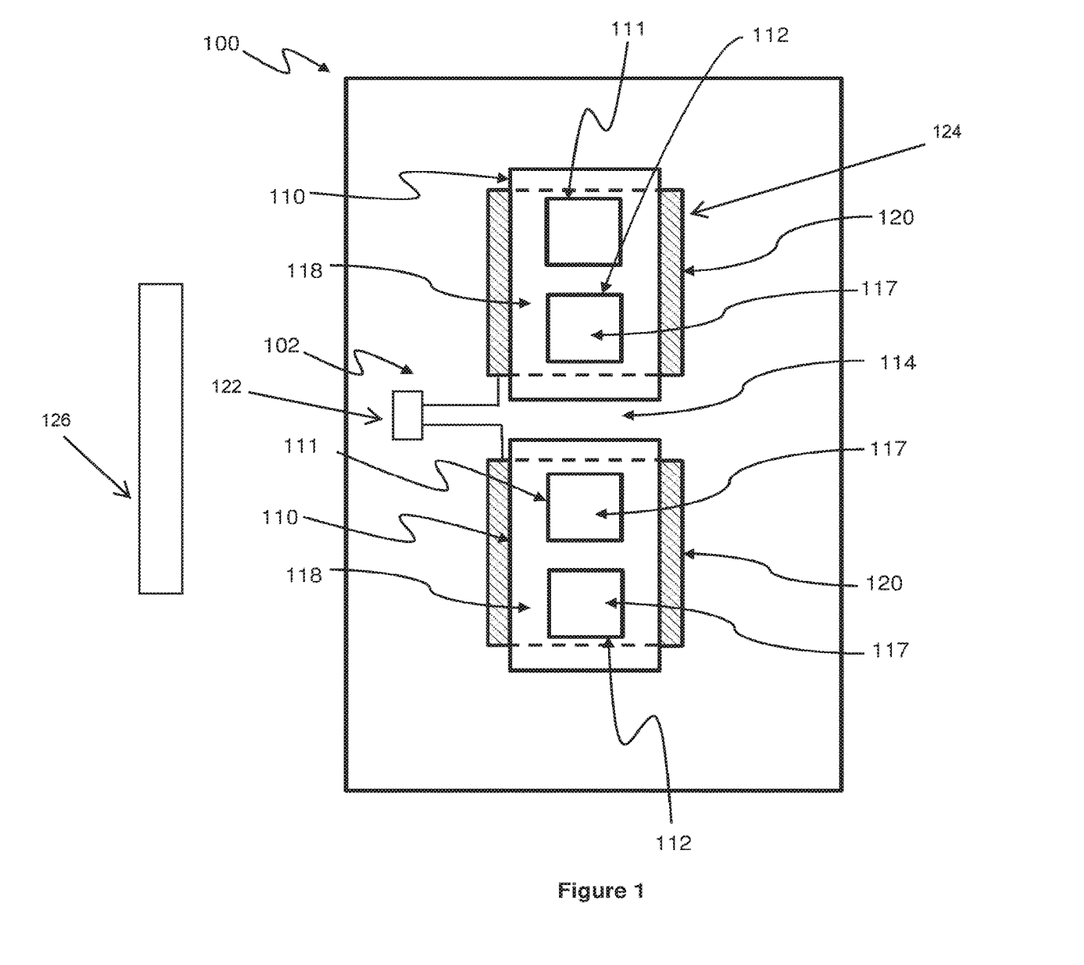
FIG. 1 is a top down view of an optical spectrometer module according to some embodiments.

Referring to FIG. 1, an optical spectroscopy module 100 is shown according to some embodiments. The optical spectroscopy module 100 may be provided as part of a modular system. The optical spectroscopy module 100 comprises two or more sample holders 110. Each sample holder 110 may be adapted to receive and reproducibly position a sample (not shown) in a fixed location within the optical spectroscopy module 100.

Any one or more of the sample holders 110 may receive a reference cell or a sample cell (not shown). The reference cell and sample cell may be cuvettes. The reference cuvette is configured to contain a carrier liquid and the sample cuvettes are configured to contain liquid test samples.

The sample holders 110 may, however, be left empty and used without a reference cuvette or without a reference material to obtain a reference signal for correcting instrument variation by measuring the transmitted light through as a reference beam.

Each sample holder 110 may also be adapted to receive discrete electromagnetic or light-based emissions (e.g. light beams) to thereby enable the one or more test samples contained in the sample holder 110 (for example within a cuvette) to be exposed to the received light beam.

Each sample holder 110 is further adapted to enable light transmitted through the sample holder (and any reference sample or test samples contained in the sample holder 110) to exit the sample holder 110.

The sample holders 110 may define one or more receptacles 111. In some embodiments, the sample holders 110 define two or more receptacles 111, 112. Each receptacle 111, 112 may be adapted and/or shaped to receive a solid sample or a cuvette. Samples or cuvettes received by receptacles 111, 112 defined by the same sample holder 110 may have a temperature that is advantageously controlled to be substantially similar or the same as they are thermally coupled to each other through the sample holder 110.

In one configuration, one or more reference receptacles 111 defined by each sample holder 110 may be used to conduct one or more reference measurements to obtain one or more reference signals. One or more sample receptacles 112 may each receive a sample (or cuvette containing a sample) to measure the light properties or transmission characteristics through the sample to obtain a sample signal.

In another configuration, the reference measurement is conducted separately to sample measurements and each receptacle 111, 112 in each sample holder 110 receives a sample during sample measurements.

In yet another configuration, one of the reference receptacles 111 is used for a reference measurement and each of the other reference receptacles 111 on separate sample holders 110 as well as each sample receptacle 112 receives a sample for sample measurements.

The receptacles 111, 112 may comprise a cuvette opening 117 configured to receive cuvettes with a body of a selected shape such as a rectangular prism or cube. The cuvette opening 117 may be shaped (e.g. as a square) with dimensions in the range of 10-20 mm. The receptacle 111, 112 may have a depth in the range of 30-50 mm. The cuvette opening 117 is sized slightly larger than the dimensions of the cuvette they are designed to accommodate to provide a clearance. For example, the receptacles 111, 112 may comprise a 14×14 mm square opening and a depth of 40 mm to accommodate cuvettes comprising a body with a 12.5×12.5 mm square base and a height of 45 mm high. The clearance may be taken up by a spring or other resiliently biased component which may be mounted diagonally to locate the cuvette on two of its four sides into a corner of the receptacle 111, 112. The receptacle 111, 112 may have a depth less than the height of the cuvette so that a sufficient amount of the cuvette is exposed to allow it to be gripped in the fingers for removal.

The optical spectroscopy module 100 further comprises two or more electro-thermal components 120. Each electro-thermal component 120 is thermally coupled to a respective sample holder 110 to control the temperature of the sample holder 110 and one or more test samples and any reference samples received by the sample holder 110.

The temperature may be controlled or at least measured to be within an operating margin of a predetermined measurement temperature. The operating margin may be in the range of 0.05° to 5°. For example, the measurement temperature may be within 0.05° of the predetermined temperature, or the measurement temperature may be within 2° of the predetermined temperature. The operating margin depends on the application of the optical spectrometer module 100, for example, the operating margin may depend on the temperature sensitivity of the experiment or absorption in the target substance of interest to temperature. Measurements can be taken while the temperature of the sample is within the operating margin. Measurements can also be taken while the sample temperature is changing, the sample temperature need not be held at a constant temperature.

In some embodiments, a thermally conductive material such as a thermal interface material (e.g. graphite foil, boron nitride impregnated silicone, thermal grease) may be used to improve the thermal coupling between the electro-thermal component 120 and the sample holder 110.

The provision of more than one electro-thermal component 120 advantageously enables the temperature of each sample holder 110 to be individually controlled. Multiple concurrent measurements can therefore be advantageously performed to reduce the amount of time for analysis. For example, in experiments involving a reaction in which measurements need to be made within a certain time period sequential measurements of a batch of samples at different temperatures is not possible. By dividing a batch of samples over different sample holders at different temperatures, it is possible to simultaneously measure the same batch after the same time period with optical spectroscopy module 100.

The sample holders 110 may be separated from each other by a gap 114 to reduce the thermal conduction between the sample holders 110 compared to if they were in direct physical contact. The separation and resulting reduced thermal conduction between the sample holders 110 advantageously assists in the temperature of each sample holder 110 being individually controlled.

A gap 114 of at least about 1 mm may provide sufficiently reduced thermal conduction between sample holders 110. In some embodiments the gap 114 is between 2 mm and 10 mm. In some embodiments the gap 114 is greater than 10 mm. The effect of radiative and convective heat transfer within the gap may be further reduced by adding thermal insulation material in the gap.

In some embodiments, the electro-thermal component 120 includes an electro-thermal transducer or a thermoelectric device such as a Peltier device to controllably adjust the temperature of the sample holders 110. Each Peltier device may be coupled to the sample holder 110 between the sample holder 110 and a base 102 of the optical spectroscopy module 100. A first side of the Peltier device may be coupled to the sample holder 110 and a second opposite side of Peltier device is coupled to the base 102. This configuration can advantageously assist in thermally isolating the sample holders 110 from each other.

One or more Peltier devices may be used for each sample holder 110. Peltier devices may be arranged to be thermally in series or parallel. In some embodiments, the electro-thermal components 120 comprise a heat exchange component 124. The heat exchange component 124 may advantageously assist in transferring heat from one side of the Peltier device to the opposite side to enable the temperature of the test samples and any reference sample to be controlled. The base 102 may, for example, act as a heat sink common to all sample holders 110.

The heat exchange component 124 may comprise a heat sink (not shown) with a plurality of vanes to assist in cooling the sample holder 110. The optical spectroscopy module 100 may also comprise a blower or fan 126. The blower or fan 126 is arranged to direct air over the plurality of vanes to thereby further assist in heat transfer to or from the heat sink.

In some embodiments, a thermal interface material may be used to improve the thermal coupling between the Peltier device and the heat exchange component.

The Peltier device may also be electrically driven to heat the sample holder 110. In this mode of operation the heat exchange component may be used to draw heat from the ambient air to transfer into the Peltier device.

The heat exchange component may include an internal channel to enable a liquid to flow through it to transfer heat between the liquid and the sample holder 110 via the electro-thermal component 120. For example, the heat exchange component may enable water to flow through the heat exchange component.

In other embodiments, the electro-thermal component 120 may comprise a resistive heating device to heat the sample holder 110 to enable the temperature of the test samples and any reference samples to be controlled.

Figure 2:
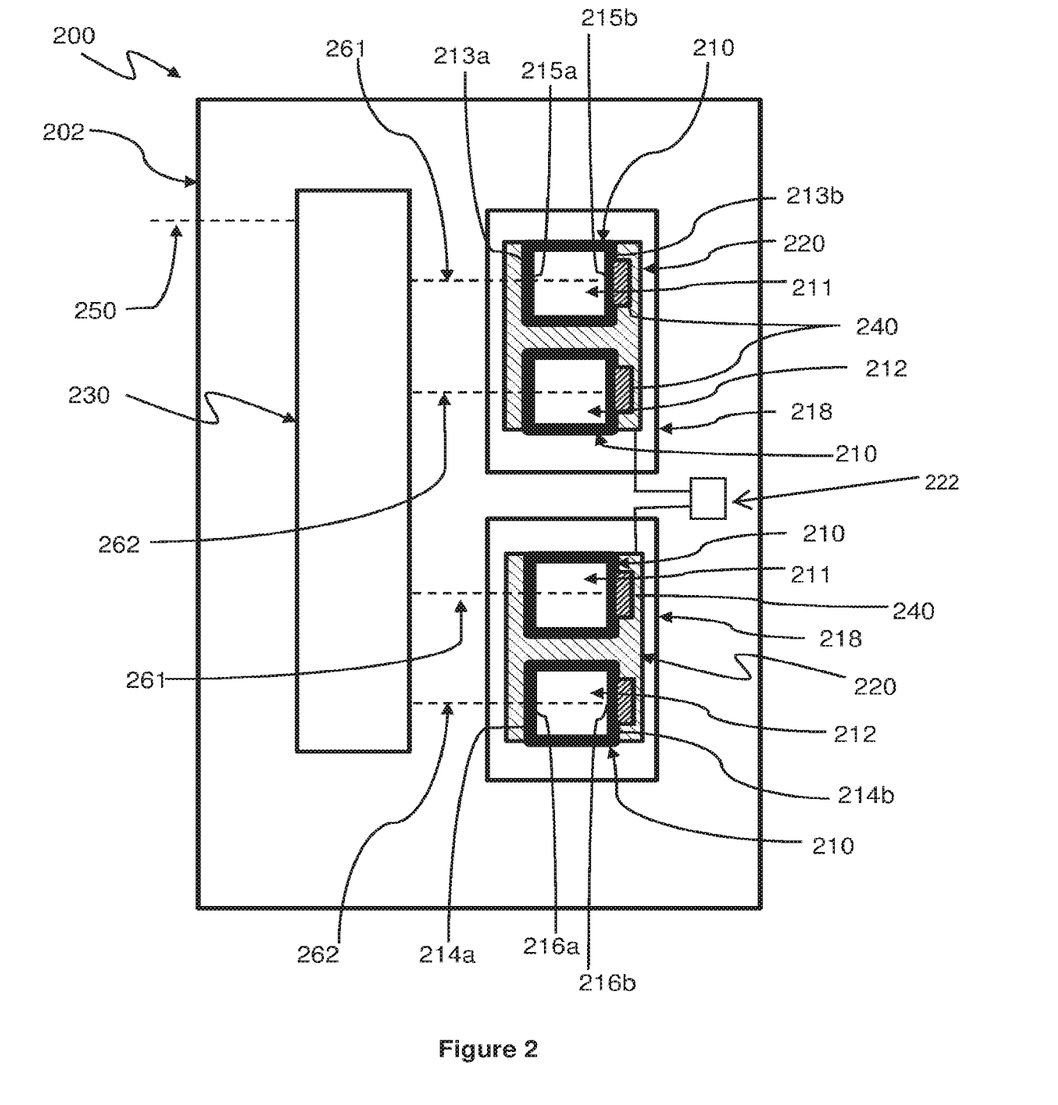
FIG. 2 is a top down view of an optical spectrometer module according to some embodiments.

Referring to FIG. 2, an optical spectrometer module 200 is shown according to some embodiments. The optical spectrometer module 200 comprises two or more sample holders 210. Sample holders 210 are the same as sample holders 110 described earlier and may define a receptacle 211, 212 but the sample holders 210 are further coupled to a support 218. The support 218 is attached to the sample holders 210 between the sample holders 210 and a base 202 of the optical spectrometer module 200. The support 218 thereby separates the sample holder 210 from the base 202.

Each sample holder 210 is thermally coupled to the electro-thermal component 220. The electro-thermal component 220 is located so as to allow light beams 261, 262 to be received by the receptacles 211, 212 and to allow the corresponding detector 240 to measure light transmitted through the receptacles 211, 212. In some embodiments, the thermal control component 220 is located underneath the receptacles 211, 212.

The sample holder 210 may be formed from a high thermal conductivity material to assist in uniform heating of the sample holder 210, cuvettes, reference cells, samples, carrier liquids and reference substances. For example, the sample holder 210 may be formed from a high thermal conductivity material such as an aluminium alloy, copper or graphite.

The thermal conductivity of the high thermal conductivity material may be greater than about 50 W/m K. The thermal conductivity of the high thermal conductivity material may be greater than about 100 W/m K.

In some embodiments, the electro-thermal component 220 may be thermally coupled to two or more sample holders 210 so that the two or more sample holders 210 can be controlled to be substantially at the same temperature. Each electro-thermal component 220 and each support 218 may thereby be connected to one or more sample holders 210 defining a reference receptacle 211 and one or more sample holders 210 defining a sample receptacle 212.

In some embodiments, the support 218 acts as part of a heat sink or a cooling component to assist in heat transfer from the electro-thermal component 220. The support 218 may therefore be formed from the high thermal conductivity material.

In other embodiments, the support 218 may be formed from a material with lower thermally conductivity than the sample holders 210 to decrease the heat conduction between the sample holder 210 and the base 202. The decrease in heat conduction advantageously reduces heat conduction between receptacles 211, 212 on adjacent sample holders 210 and therefore assists to thermally isolate the sample holders 210. For example, the support 218 may be formed from a low thermal conductivity material such as a polymer (e.g. polycarbonate) or an iron alloy (e.g. cast-iron).

The thermal conductivity of the low thermal conductivity material may be less than about 10 W/m K. The thermal conductivity of the low thermal conductivity material may be less than about 1 W/m K.

Providing two or more electro-thermal components 220 enables the temperature of each sample holder 210 to be independently controlled. This allows measurements to be concurrently performed at different temperatures. Advantageously, this reduces the total amount of time required to conduct measurements at different temperatures.

In some embodiments, the optical spectrometer module 100, 200 further comprises a temperature controller 122, 222 coupled to the electro-thermal components 120, 220. The temperature controller 122, 222 is configured to control the electro-thermal components 120, 220, thereby enabling the temperature of sample holders 110, 210 and the test samples and any reference sample to be controlled.

In some embodiments, the temperature controller is adapted to control each of the electro-thermal components individually so that the temperatures of each sample holder 210 are independently controlled. Alternatively, two or more temperature controllers may be provided to independently control the temperatures of each sample holder 210.

The optical spectrometer module 100, 200 may also comprise a plurality of temperature sensors (not shown) to measure the temperature of one or more of the electro-thermal components 120, 220, and/or test samples or any reference samples. The thermal temperature controller may be coupled to the temperature sensors to control the measured temperature in a feedback system.

In some embodiments, the optical spectrometer module 200 further comprises a light distribution component 230. The light distribution component 230 is adapted to receive light 250 from a light source (not shown) and distribute the received light 250 to concurrently provide two or more light beams 261. Each light beam 261 is received by a corresponding sample holder 210 defining receptacle 211. The light distribution component 230 may also be adapted to provide one or more light beams 262 to be received by one or more sample holders 210 that define receptacles 212.

Figure 3:
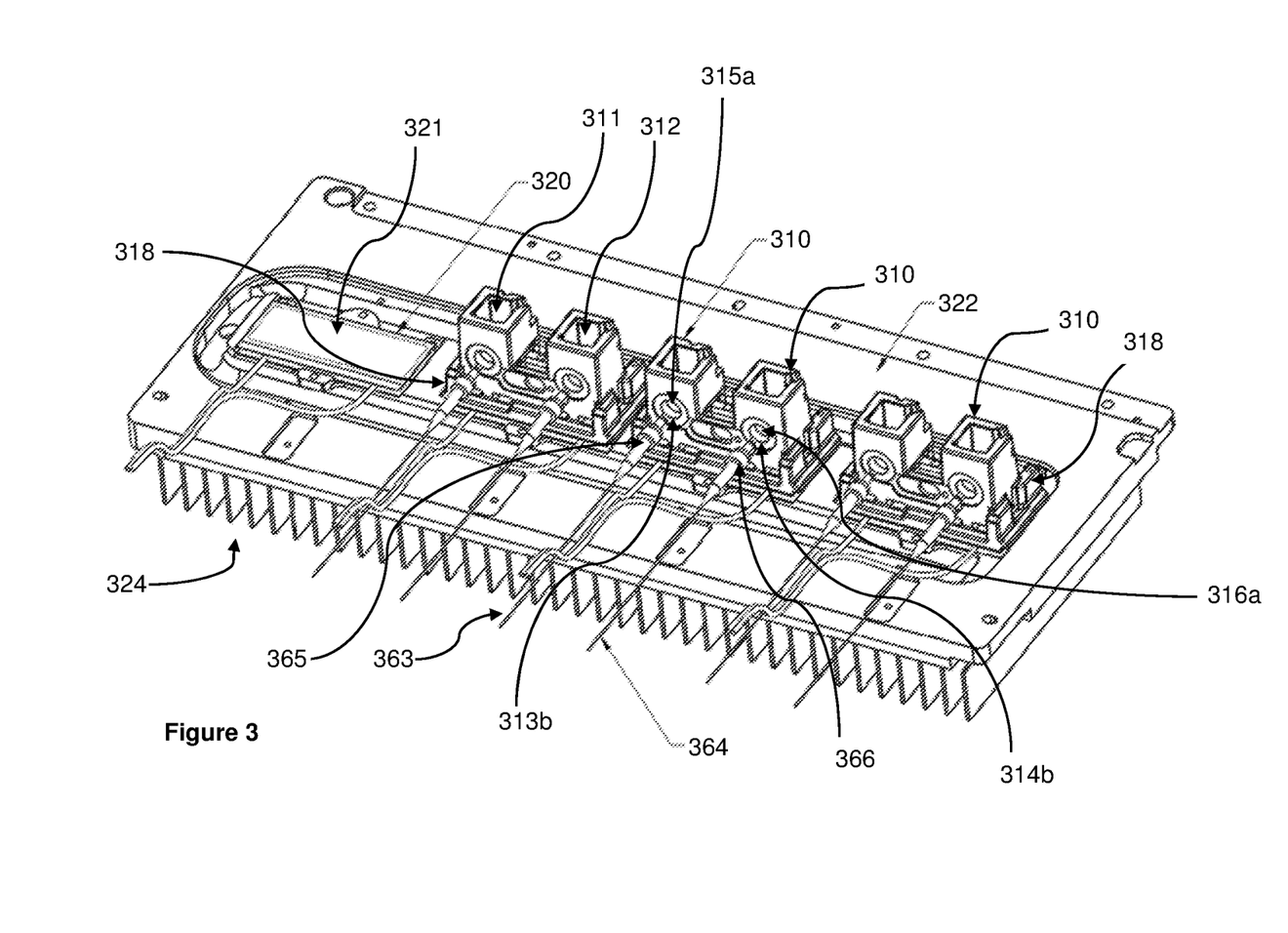
FIG. 3 is a perspective view of a set of sample holders for an optical spectrometer module according to some embodiments.

The light distribution component 230 may, for example, comprise a fibre optic bundle or a network of mirrors, such as the fibre optic bundle 363, 364 of FIG. 3. In some embodiments, the light distribution component 230 comprises a monochromator component, such as the monochromator component 365, 366 of FIG. 3, to produce (monochromatic) light beams 261, 262 that have a narrow wavelength range. The produced light may, for example, have a bandwidth in the range of 0.1 to 5 nm.

The sample holders 210 are adapted to receive the light beams 261 or the one or more beams 262 at receptacles 211, 212. For example, the sample holder 210 may comprise a first wall 213a defining an opening 215a to enable the light beam 261 to be directed into the cuvettes received in the receptacle 211. The receptacles 212 may also comprise a first sample wall 214a that each define a further opening 216a to enable each of light beams 262 to be directed into the cuvettes received in receptacles 212.

Each sample holder 210 is also further adapted to enable light transmitted through the receptacles 211 and the receptacles 212 to exit the receptacles 211, 212. This enables a detector 240 to be placed adjacent each corresponding receptacle 211, 212 to enable measurements of the intensity of transmitted light through the reference sample and the one or more samples to determine multiple levels of optical absorption by two or more samples. For example, the sample holder 210 defining receptacle 211 may comprise a second wall 213b opposite the first wall 213a. The second wall 213b defining an exit 215b to enable the reference beam 261 that has been transmitted across the receptacle 211 and through a cuvette (if present) to be directed into one of the detectors 240. The sample holder 210 defining receptacles 212 may also comprise a second sample wall 214b opposite the first sample wall 214a that define a further exit 216b to enable each of test beams 262 that have been transmitted across the sample receptacle 212 and through the cuvette (if present) to be directed into another one of the detectors 240.

In some applications, it may be possible to conduct concurrent measurements and concurrently determine levels of absorption.

The optical spectrometer module 200 may further comprise two or more detectors 240, wherein each detector 240 is located directly adjacent to a corresponding sample holder 210 to acquire or measure light transmitted through reference samples and test samples and enable concurrent measurements from the reference sample and the one or more samples to enable a level of optical absorption by the one or more test samples to be concurrently determined. The optical spectrometer module 200 may comprise three or more detectors 240, wherein each detector 240 is located directly adjacent to a corresponding sample holder 210 defining receptacles 211, 212.

In some configurations, light beam 261 and receptacle 211 may be used to perform a reference measurement. Light beam 262 and receptacles 212 may be used to perform an optical measurement of a test sample. Measurements may be performed sequentially or concurrently.

In some embodiments, each detector 240 is attached to its corresponding receptacle 211, 212 and directly measures the light transmitted through the reference samples. This advantageously minimises any loss of intensity in transmitted light as there are no additional optical components between the detector 240 and the receptacles 211, 212. It is in part practical to directly attach the detector 240 to the receptacles 211, 212 because the sample holder 210 does not move and is fixed in position. There may be no need for a movement mechanism in the optical spectrometer module 200. This advantageously provides additional room within the optical spectrometer module 200 to directly include the detectors 240 in the optical spectrometer module 200.

In some embodiments the openings 215a and further openings 216a may have dimensions in the range of about 2 mm to 5 mm. For example, the openings 215a and further openings 216a may have a width of about 2 mm and a height of about 2.5 mm.

Referring to FIG. 3, a set of sample holders 310 adapted to be included in the optical spectrometer module 100, 200 is shown according to some embodiments. Each sample holder 310 defines either a reference receptacle 311 or a receptacle 312. The sample holders 310 share a common heat sink 322 but are otherwise the same as sample holders 110, 210. Six sample holders 310 are provided for in the illustrated embodiment, two of the sample holders 310 are not shown to enable an underlying electro-thermal component 320 to be seen.

The electro-thermal components 320 are thermoelectric devices as described above. An upper side 321 of the electro-thermal component 320 is thermally coupled to the base of the reference receptacle 311 and the sample receptacles 312. The heat sink 322 is thermally coupled to an underside (not shown) of the electro-thermal component 320. The heat sink 322 comprises a plurality of vanes 324 that extend away from the electro-thermal component to assist in heat dissipation.

The electro-thermal component 120, 220, 320 may be adapted to adjust the temperature of the sample holder 110, 210, 310 over the range between −10° C. and 110° C. In some embodiments, the electro-thermal component 120, 220, 320 may be adapted to adjust the temperature of the sample holder 110, 210, 310 over the range between 0° C. and 60° C.

The sample holders 310 may also comprise a support 318 to assist in fixing the sample holders 310 into position within the optical spectrometer module 100, 200. The support 318, for example, attaches the receptacles 311, 312 to the heat sink 322. To restrict the heat transfer between the sample holders 310 and the support 318, the support 318 may be formed from a low thermal conductivity material.

In some embodiments, the receptacles 311, 312 have a height of about 40 mm. The openings 315a, 316a and recesses 313b, 314b may be circular and centred 15 mm or 20 mm above the base of the receptacles 311, 312. As the bases of the sample holders 310 are temperature controlled by the electro-thermal components 320, the portion of the reference or sample closest to the base may be closer to the desired predetermined temperature. Therefore, locating the openings 315a, 316a and recesses 313b, 314b closer to the base of the cuvette than the top enable the portion of the reference or sample closer to the base to be analysed. This may thereby advantageously lead to more accurate and reliable analysis.

In some embodiments, the sample holders 310 may further comprise a stirring component that enables a liquid sample within the cuvette to be stirred to minimise temperature differences and other uniformities in the sample.

In some embodiments, the sample holders 110, 210 and set of sample holders 310 may be fixed during measurement but otherwise removable. The sample holders 110, 210, 310 may, for example, be fixed by fasteners such as screws, clips or by slotting into place. The sample holders 110, 210 and set of sample holders 310 may, for example be removed for maintenance, repair or replacement.

A spectroscopy system is also disclosed comprising the optical spectrometer module 100, 200 removably coupled to a light source module (not shown). The light source module comprises a lamp. For example, the lamp may be a high output flash lamp that is capable of producing a pulsed light output with an energy of up to 0.5 J per pulse (per flash) at a rate of up to 300 Hz. Advantageously, the output light intensity may be divided into up to 8 light beams, each with sufficient intensity to perform optical spectroscopy. The output lamp also produces light over a range of wavelengths between 190 nm to 2500 nm. In some embodiments, the lamp may be a short-arc flash-lamp comprising electrodes contained in pressurised Xenon gas. For example, the light source module may comprise a 1100 series FX-1160 short-arc flash lamp produced by Exelitas Technologies.

Providing the spectroscopy system as a modular system advantageously enables interchange and interoperability between modules for different applications. The light source module may, for example, be removed and interchanged between the optical spectroscopy module 100, 200 disclosed herein and another optical spectroscopy module. This provides the end user with the flexibility to use a common module to save costs or to readily interchange a faulty module if necessary.

The light source module may also comprise a monochromator component to produce a narrow wavelength output (monochromatic) light beam 250.

The spectroscopy system may further comprise a computational unit adapted to receive light intensity data from the optical spectroscopy module 100, 200. The computational unit comprises a processor adapted to compare a measured intensity of detected light from the reference sample to each of the one or more test samples to thereby determine the level of optical absorption by the one or more samples.

Figure 4:
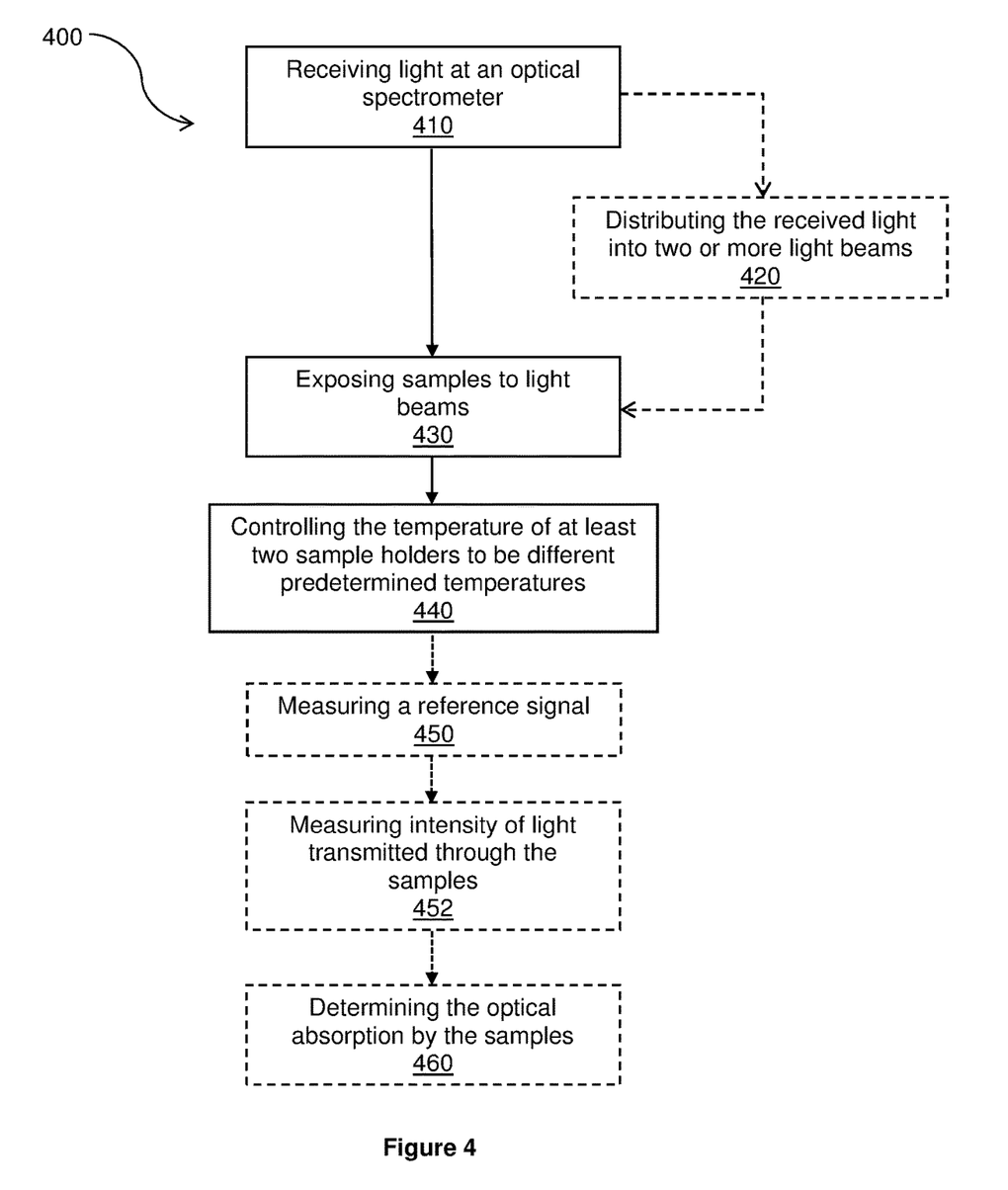
FIG. 4 is a flowchart for a method of optical analysis according to some embodiments.

Referring to FIG. 4, there is shown a flowchart illustrating a method of optical analysis 400 according to some embodiments. The method 400 comprises receiving light 250 at the optical spectrometer module 100, 200, at 410. The method 400 further comprises, at 420, distributing the received light 250 into two or more light beams 261, 262 with the light distribution component 230 of the optical spectrometer module 100, 200. Reference samples and test samples are received by sample holders 110, 210, 310 are exposed to the light beams 261, 262, at 430. The method 400 also comprises maintaining at least two of the two or more sample holders 110, 210, 310 within an operating margin of different predetermined temperatures using the electro-thermal component 120, 220, 320, at 440.

The different predetermined temperatures may be obtained as each sample holder 110, 210, 310 comprises its own electro-thermal component 120, 220, 320. As described above, the sample holders 120, 220, 320 may also comprise a heat exchange component such as a heat sink 322. In some embodiments heat is exchanged with the sample holders 120, 220, 320 and the heat exchange component with either an air blower, a fan or flowing water.

The predetermined temperature of the sample holders during sample measurement 120, 220, 320 may be dynamically maintained by controllably heating the sample holders 120, 220, 320 with an electro-thermal transducer such as a thermoelectric device or resistive heater as described above.

The received light 250 may be monochromatic. Alternatively, the method 400 may also comprise receiving light 250 as broadband light and producing monochromatic light beams 261, 262 with the light distribution component 230.

The method of optical analysis 400 may further comprise, at 450, measuring the intensity of light transmitted through the receptacles 111, 112, 211, 212, 311, 312 and any reference with a detector to obtain a reference signal. The method 400 may also further comprise at 452, measuring the intensity of light transmitted through the one or more test samples with one or more detectors 240 to obtain a sample signal. The intensity of each transmitted light beam is measured with one detector 240.

The method 400 may also comprise determining one or more levels of optical absorption of a target substance, at 460. This can, for example, be performed by dividing the reference signal by the sample signal.

In some embodiments, method 400 comprises repeating the exposing 430 and measuring 450 at different wavelengths to concurrently obtain an intensity spectrum for a reference and one or more test samples.

Method 400 may also be repeated over a range of different predetermined temperatures to concurrently obtain optical absorption data for the one or more test samples over the range of temperatures. For example, the temperature of reference samples and test samples may be continually or periodically changed and measurements can be taken when the temperatures are within the operating margin of the predetermined temperatures.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An optical spectrometer module for analysing samples comprising:
    two or more sample holders, each sample holder adapted to:
        receive and reproducibly position one or more samples in fixed locations within the optical spectrometer module;
        receive a light beam to expose the samples contained in the sample holder to the received light beam; and
        enable light transmitted through the sample holder to exit the sample holder;
    at least one detector, wherein the at least one detector is located adjacent to one sample holder to directly measure light transmitted through the sample holder and enable concurrent measurements from the two or more sample holders to enable a level of optical absorption by the one or more samples contained in each sample holder to be determined;
    two or more electro-thermal components, each electro-thermal component thermally coupled to a respective sample holder to control the temperature of the one or more samples contained in the sample holder; and
    two or more temperature controllers each coupled to one of the electro-thermal components, wherein the temperature controllers control each of the electro-thermal components individually.

2. The optical spectrometer module of claim 1, wherein the electro-thermal components comprise a thermoelectric device.

3. The optical spectrometer module of claim 1, wherein at least one of the samples comprises a reference.

4. The optical spectrometer module of claim 1, wherein, the sample holders are formed from a material with high thermal conductivity.

5. The optical spectrometer module of claim 1, further comprising a heat exchange component adapted to assist in heat exchange between the electro-thermal component and surrounding air.

6. The optical spectrometer module of claim 5, wherein the heat exchange component comprises a plurality of vanes thermally coupled to the electro-thermal components and a blower arranged to blow air over the plurality of vanes.

7. The optical spectrometer module of claim 1, wherein the sample holders are separated by a gap.

8. The optical spectrometer module of claim 7, wherein the gap comprises a material with low thermal conductivity.

9. The optical spectrometer module of claim 1, wherein each sample holder comprises at least one sidewall defining:
    an opening adapted to receive the light beam; and
    an exit positioned opposite the opening to enable the light transmitted through the sample holder to be measured by the at least one detector.

10. The optical spectrometer module of claim 1, wherein each sample holder defines an opening at an upper end of the sample holder for receiving one or more sample cells.

11. A method of optical analysis comprising:
    receiving light at the optical spectrometer module of claim 1;
    exposing samples contained in the sample holders to the received light; and
    individually controlling the temperature of at least two of the sample holders at a predetermined temperature.

12. The method of optical analysis of claim 11, wherein individually controlling the temperature comprises controlling the temperature of each sample holder to be at a different predetermined temperature.

13. The method of optical analysis of claim 11, wherein individually controlling the temperature comprises exchanging heat between a heat exchange component and the sample holders with either an air blower or a flowing liquid.

14. The method of optical analysis of claim 11, wherein individually controlling the temperature comprises controllably heating the sample holders with a thermoelectric device or resistive heater.

* * * * *